United States Patent
Vincent et al.

(10) Patent No.: US 6,938,097 B1
(45) Date of Patent: Aug. 30, 2005

(54) SYSTEM FOR EARLY PACKET STEERING AND FIFO-BASED MANAGEMENT WITH PRIORITY BUFFER SUPPORT

(75) Inventors: Paul B. Vincent, Centerville, UT (US); Bryan A. Ford, Fort Collins, UT (US)

(73) Assignee: SonicWALL, Inc., Sunnyvale, CA (US)

( * ) Notice: Subject to any disclaimer, the term of this patent is extended or adjusted under 35 U.S.C. 154(b) by 117 days.

(21) Appl. No.: 10/676,638

(22) Filed: Sep. 30, 2003

Related U.S. Application Data

(62) Division of application No. 09/609,731, filed on Jul. 2, 2000, now abandoned.

(60) Provisional application No. 60/142,262, filed on Jul. 2, 1999.

(51) Int. Cl.[7] ............................................. G06F 13/00
(52) U.S. Cl. ..................... 709/240; 709/224; 709/238; 370/238; 370/392
(58) Field of Search ................................ 709/201–202, 709/215, 223–225, 238–242, 392; 370/238, 370/392

(56) References Cited

U.S. PATENT DOCUMENTS

| | | |
|---|---|---|
| 5,305,321 A | 4/1994 | Crayford |
| 5,440,553 A | 8/1995 | Widjaja et al. |
| 5,541,922 A | 7/1996 | Pyhalammi |
| 5,546,390 A | 8/1996 | Stone |
| 5,555,254 A | 9/1996 | Injeyan et al. |
| 5,590,370 A * | 12/1996 | Asthana et al. ................ 712/14 |
| 5,598,410 A | 1/1997 | Stone |
| 5,857,075 A | 1/1999 | Chung |
| 6,304,553 B1 * | 10/2001 | Gehman et al. ............. 370/235 |
| 6,314,525 B1 * | 11/2001 | Mahalingham et al. ........ 714/4 |
| 6,327,625 B1 | 12/2001 | Wang et al. |
| 6,385,672 B1 | 5/2002 | Wang et al. |
| 6,393,457 B1 | 5/2002 | Allison et al. |
| 6,483,804 B1 | 11/2002 | Muller et al. |
| 6,549,960 B1 | 4/2003 | Allison et al. |
| 6,791,947 B2 * | 9/2004 | Oskouy et al. ............. 370/238 |
| 6,795,506 B1 * | 9/2004 | Zhang et al. .......... 375/240.26 |

\* cited by examiner

*Primary Examiner*—Moustafa M. Meky
(74) *Attorney, Agent, or Firm*—Blakely, Sokoloff, Taylor & Zafman LLP

(57) ABSTRACT

A network interface card (NIC) with FIFO-based packet memory management including priority queues for controlling scheduling of network traffic to thereby prioritize packet transmission for time-critical applications. Furthermore, the invention comprises a system for early packet steering, wherein a packet header is analyzed without having to store the entire packet and before a packet payload arrives, thereby making it possible to make steering decisions before the complete arrival of the packet.

15 Claims, 6 Drawing Sheets

SYSTEM FOR EARLY PACKET STEERING AND FIFO-BASED MANAGEMENT WITH PRIORITY BUFFER SUPPORT

CROSS-REFERENCE TO RELATED APPLICATIONS

This application is a Divisional of Ser. No. 09/609,731, filed Jul. 2, 2000, now abandoned. This application also claims the benefit of provisional application No. 60/142,262 filed Jul. 2, 1999.

BACKGROUND OF THE INVENTION

1. The Field of the Invention

This invention relates generally to network data routing. More specifically, the present invention concentrates on improving two aspects of data routing. The first improvement is utilizing a data packet steering mechanism that parses elements of the packet header in parallel and in advance of the body of the packet, thereby increasing efficiency and reducing latency and processor overhead. The second and related improvement is a FIFO-based packet memory management system that provides greater flexibility and control over network packet transmission.

2. The State of the Art

The state of the art in high speed data access on computer networks has in large part been driven by exponential growth in the Internet and e-commerce. Furthermore, as computers become more powerful, applications are always being developed which take advantage of any increase in computer performance. Often, these applications utilize networks, both local and global.

It is becoming increasingly important to keep pace with the increased demands for network services by the general public. This can be accomplished by removing the bottlenecks that inhibit data transfer across computer networks because the thirst for increased bandwidth is ever present. Internet users are becoming ubiquitous as home users and businesses tap into the resources of the information superhighway. Electronic mail, which is fast becoming the preferred method of communication in business as well as in the private sector, and new business models, such as the Virtual Office, rely on computer networks for their very existence. In essence, the demand for computer networking connectivity and bandwidth is large, and growing larger all the time.

In an effort to keep up with increasing network connectivity and bandwidth demands, makers of networking hardware and software, as well as the Information Services (IS) managers that operate computer networks are continually looking for ways to improve network connectivity and bandwidth, while reducing network traffic latency.

Increasingly, computer networks are being called upon to carry time-critical telecommunications and video data streams. Guaranteed bandwidth to residential communications ports that carry voice, video and data has increased from tens of kilobits/second to Megabits/second levels. Commercial communications bandwidth has increased to several Megabits/second guaranteed bandwidth per port. However, the infrastructure that enables Wide and Local Area Networks to operate is comprised of installed network gear that is running industry standard network protocols that are not well-suited for the performance demands of time-critical, latency-intolerant network traffic such as voice and video. The reason for this is that the traditional approach to providing connectivity and bandwidth in today's computer networks is based on packet-switched protocols.

FIG. 1 is an illustration of how a time-critical application is typically integrated into the transmit path for network traffic in a traditional, packet switched computer network environment. Within an operating system 110, executing on a packet-switched network host computer, a time critical application 13 takes analog data 111, such as a voice or video data stream that has been digitized by an Analog-to-Digital (A/D) converter 114, and places it in an application data buffer 115 in system memory. The time critical application 113 competes with other network applications 112 for the network protocol stack 116 and other system resources to thereby establish a network connection and to process the data stream into packets.

The packets from the time critical application 113 are disposed in system packet data buffers 118 along with packets from a number of other data streams and pointed to by a linked list of packet descriptors 117. A direct memory access (DMA) engine 119 located on a network interface card (NIC) 123 follows the linked list of packet descriptors 117 in order to find and move the packet data from the appropriate packet buffer in the system packet data buffers 118 to a packet first-in-first-out FIFO buffer 122 on the network interface card 123. The packet data is then moved sequentially in the order in which it was received to the Media Access Control (MAC) interface 120. The MAC interface 120 translates the digital packet data into network signals 121 to be transmitted on the network physical interface. The receive path is essentially the transmit path shown in FIG. 1, but operated in the reverse direction.

In order for a real-time conferencing application to be perceived as good, it must have less than 200 ms of latency (time from first analog capture to final display), less than 20 ms of jitter (the relative time difference between individual packet delivery), and sufficient bandwidth to maintain frame rate and resolution in real-time.

While the prior art architecture shown in FIG. 1 is used with some success in legacy networks for providing the bandwidth and latency requirements of timing-insensitive computer data traffic, several aspects of this architecture make it ill-suited for the low latency and strict timing requirements of video or even voice data.

There are several obstacles to meeting the requirements of real-time network traffic. In particular, the serial nature of the packet FIFO 122 on the NIC 123 gives no priority to time-critical packets. The system also has non-deterministic latency, thus introducing jitter.

What is needed is a means for enabling the NIC to have more flexibility and control in how it schedules packets for transmission, based on Quality of Service (QOS) parameters.

There is another issue involved here as well. Data on networks travels in packets, or bundles of data, where the packet is generally of variable length. Packetization of data enables the isolation of different protocols so that data can be transmitted and received through disparate types of networks without regard to the content of the information being transmitted.

In data networks, it is necessary to direct, or steer, data packets from node to node within a network or within a network traffic device such as a router. As packet traffic arrives at a node, key decisions have to be made about whether to accept or reject the packet, where the packet must be routed for further processing, and so forth.

The node device that accepts incoming data is the MAC. It connects the network router or switch to the network cable or fiber and converts the packet traffic into useable data for the hardware and software within the network node, or controller.

In prior art store and forward network controllers, a packet is fully received by a MAC and stored in a buffer where it can then be accessed by a processor or moved to other memory accessed by a processor or moved to other memory accessed by a processor. The processor examines the packet to parse or extract the information necessary to route the packet. This is generally done because the cyclic redundancy error checking (CRC) bytes are at the very end of the packet. Table 1 is provided to illustrate how data is stored in a typical Ethernet IP packet that arrives at a MAC port.

As packet header information becomes available, the first field examined is the 6-byte destination address (DA) 16. From this, decisions must be made about where the packet must go. In other words, there are multiple outcomes 18, 20, 22 possible that are based on the data in the DA field 16. For instance, it must be determined whether this is the current device's address, a broadcast address 18, or the address of some other destination 20.

Assuming the packet is intended to remain and be processed further, the next processing step examines the 6-byte source address (SA) 22 to determine if, for instance, this packet is from a port that the current device is accepting data from. Again, several outcomes are 24, 26 are possible.

TABLE 1

| Preamble | Ethernet Header | | | Data (payload) | | Frame Check Sequence |
|---|---|---|---|---|---|---|
| 8 bytes | 6 bytes | 6 bytes | 2 bytes | IP Header | Additional Data | |
| | | | | 20 bytes | Up to 1480 bytes | 4 bytes |
| Clock bits & SFD | Destination Address (DA) | Source Address (SA) | | IP Routing, ID, Type, Other Data | TCP Headers & Higher Level Data | CRC |

The preamble contains 62 bits of alternating 1's and 0's, used by the receiver to acquire and synchronize with the incoming signal. The final 2 bits known as the start of frame delimiter (SFD), are consecutive 1 bits that are used by the hardware to align the bytes.

The header information in a generic Ethernet packet, the source address (SA), destination address (DA), and protocol or length information, is contained in the first 14 bytes of the packet following the preamble, regardless of the length of the payload or higher level data carried by the packet.

The data or payload bytes, contain whatever higher level data is being passed across the network. This data is generally independent of all processing manipulation at this level. Certain types of packets, however, contain useful routing information at the beginning of the payload. The inventors believe that it may be fruitful to examine the payload further. For example, in all TCP/IP packets, important routing information is contained in the first 50 bytes of the payload region of the packet.

By convention, routing information for all normally used network protocols is contained in the first 50 bytes. Therefore, it is generally recognized that the first 64 bytes of an Ethernet packet will contain all the critical information necessary to route the packet. The data portion of a generic Ethernet packet may not exceed 1500 bytes in length. In the TCP/IP packet shown, the first 20 bytes comprise the IP header, shown separately. Additionally, 20 bytes of TCP header information are contained in the Data field. This leaves up to 1450 bytes for other data. Finally, the Frame Check Sequence (FCS) contains 4 bytes of CRC error checking data to help ensure the packet is not corrupt or malformed.

FIG. 2 shows that the decisions that need to be made in the parsing of the packet header can be represented as a tree. In this figure, each circle represents a decision outcome 10. Within each decision circle, the selected field identifier 12 is shown, and below that, the position of the bytes 14 that represent that field within the packet.

The next field, bytes 13 and 14, identifies the protocol type 26. Again, the tree may branch in many different ways, whether the packet is IP 28, IPX 30, AppleTalk or some other network protocol 32. Each of these, again, will have multiple branching possibilities 34, 36, 38. In the example, the packet is an IP protocol packet 34.

The next decision is to determine what kind of IP packet it is. The options include TCP 34, UDP, ARP 113, etc. This data is found in byte 9 of the IP Header. Following FIG. 2 to the bottom, this TCP-style (determined by bytes 35 to 64) IP packet contains a variable-length URL 40, or world wide web address.

FIG. 3 is provided to show the manner in which this packet processing is normally implemented in hardware and is illustrated in a block diagram. The packet arrives 52 in an elastic buffer 54, a part of the MAC 50, which serves as a clock matching device, collecting bytes of the incoming packet and matching the bit rate of the incoming packet to the speed of the hardware. Sometimes, the DA is checked at this point and a decision is made whether to continue accepting the packet. The packet is then moved to a larger buffer 56, which can either be system memory 58 or a FIFO buffer 56 connected to system memory. Once the entire packet is in system memory, it is parsed by the processor and steering information is extracted.

Once the packet in system memory 58 has been parsed, it is routed 64 to the appropriate output port. The routing mechanism 62 may or may not be memory based. If it is not memory-based, the system memory 58 must be large enough to hold outgoing packets and accommodate latencies and any blockages that occur in the output data flow.

In a processor-based system, the CPU 60 is responsible for parsing the packet headers to derive routing information. This is normally done by comparing the incoming data to a series of known outcomes, or criteria. If there is a match, a jump occurs to enable the appropriate routing. If not, a jump to another comparison process occurs, and then another, until a match is found or it is determined that there is an error.

FIG. 2 outlines the flow of one example in the decision tree. There is a subset of destination addresses that the processor is programmed to act upon 18, 20, 22. For example, there may be 10 DA's that this particular device needs to know about. Thus we may only achieve a 10:1 ratio of "first compare" successes. Usually, designers will apply weightings to the multitude of compares that must be performed. Statistical analysis is employed to prioritize the order of testing. This prioritization is based on the likelihood of a given outcome. In other words, the most commonly expected outcomes, and thus the most common data paths, will be tested first.

In this example, three possible outcomes are shown 18, 20, 22 and a successful SA compare 22 forms the basis of the next compare. We assume that all source addresses are valid and acceptable, a 1:1 hit ratio.

The next comparison to be made originates with the protocol field 24. It may have a 3:1 or better hit ratio. Since IP is the most common protocol encountered, it is tested first, followed by IPX 26, then AppleTalk and others 28. Since this is a 16-bit field, there are actually 65,536 possibilities. Designers typically optimize for the top 32 outcomes based on statistical analysis of the expected traffic, yielding a fairly reliable worst-case 32:1 ratio.

Assume that there is a match on TCP. The next comparison examines the TCP header 30 and asks what kind of TCP data is being carried, in this case a URL 36, or address of a world wide web site. This is where the tree tends to spread widely. At the URL level, for example, there may be another 256 authorized outcomes, a worst-case hit ratio of 256:1 where there may not be significant statistical weighting to optimize performance.

The sequential nature of this traditional parsing mechanism is inefficient. If this process is managed by a best-case high-speed RISC processor, for instance, one that can do a compare and branch in a single clock cycle, it may take hundreds or even thousands of cycles to branch all the way down this decision tree when a worst-case packet arrives.

A worst-case packet would be one where each decision point results in the least-likely outcome, in other words the last one tested. After testing all of the pre-determined outcomes, the packet is passed off to the processor for further consideration. If a stream of worst-case packets arrives, the processor is likely to fall behind. This risk is reduced, but not eliminated, by statistical analysis of the anticipated traffic and weighting of the various possible outcomes.

The burgeoning number of diverse applications running over today's data networks complicates this scenario. Digital video, voice over IP (VOIP), and other converging uses of data networks logarithmically increases the complexity and sheer number of decisions that must be made to manage network traffic. As new and different kinds of data traffic compete for routing and QOS resources, prioritization becomes more difficult.

What is needed is a way to traverse a very complex decision tree quickly and efficiently, without incurring long delays that may be encountered while a buffer receives the rest of a packet. The method should also not require extremely fast sequential processing in order to keep up with minimum length packets.

As payload size, and this packet size, decreases, the overhead associated with that payload increases. The worst-case scenario in an Ethernet environment is a continuous stream of minimum-size packets. A minimum size packet would consist of the 64-byte header, a preamble of 8 bytes, a CRC of 4 bytes, and an interframe gap of 12 bytes, for a total of 88 bytes. To achieve wire-speed performance, this small packet must be fully processed in time for the hardware to receive the next packet. In a Gigabit environment, this must be within a time window approximately 700 nanoseconds long.

Accordingly, what is needed is a system whereby critical routing decisions can be made without the need to store the entire packet prior to processing.

OBJECTS AND SUMMARY OF THE INVENTION

It is an object of the present invention to provide a system by which a network interface card is able to control scheduling of packets for transmission based on a determinable criteria.

It is another object to provide a system that enables a network interface card to prioritize packet transmission to thereby support time-critical applications.

It is another object to provide a system which can provide early packet steering so that time-critical decisions can be without having to store a packet.

It is another object to provide this early packet steering without having to use extremely fast sequential processing so that even minimum length packets can be processed.

It is another object to process incoming data packets utilizing a steering mechanism that parses elements of a packet header in parallel and in advance of the packet's actual payload.

In a preferred embodiment, the present invention is a network interface card (NIC) with FIFO-based packet memory management including priority queues for controlling scheduling of network traffic to thereby prioritize packet transmission for time-critical applications. Furthermore, the invention comprises a system for early packet steering, wherein a packet header is analyzed without having to store the packet and before a packet payload arrives, thereby making it possible to make steering decisions before the complete arrival of the packet.

In a first aspect of the invention, a network interface card includes a FIFO buffer that maintains a list of free buffers and manages use of the packet buffer memory.

In a second aspect of the invention, synchronization of events is critical. Therefore, allocation and de-allocation of buffers must be flawless or there will be memory leakage.

In a third aspect of the invention, FIFO-based buffer allocation enables efficient use of packet buffer space.

In a fourth aspect of the invention, the system is dynamically tuned for different network traffic profiles by utilizing a programmable arbitration and "kill packet" strategies.

In a fifth aspect of the invention, the need to buffer entire packets or reject packets due to a processing bottleneck is eliminated or reduced.

In a sixth aspect of the invention, multiple parallel decision logic is implemented within the MAC to thereby parse the header of the incoming packet and obtain complete steering information in advance of the packet's arrival.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
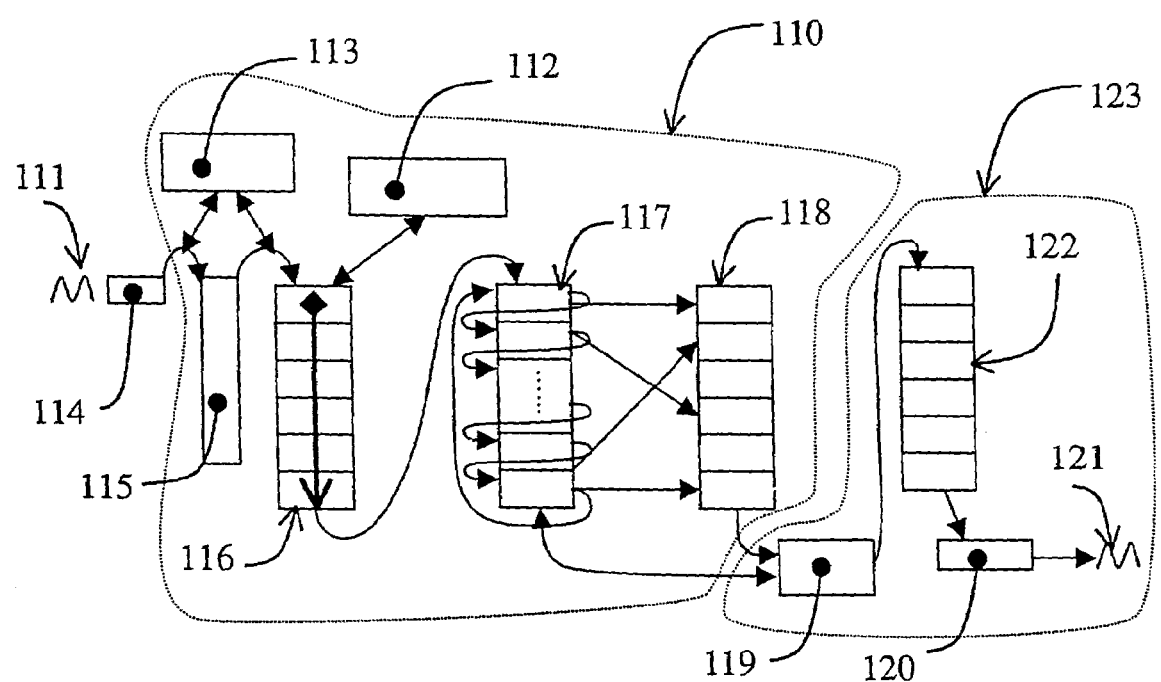
FIG. 1 is an illustration of how a time-critical application in the prior art is typically integrated into the transmit path for network traffic in a traditional, packet switched computer network environment.
Figure 2:
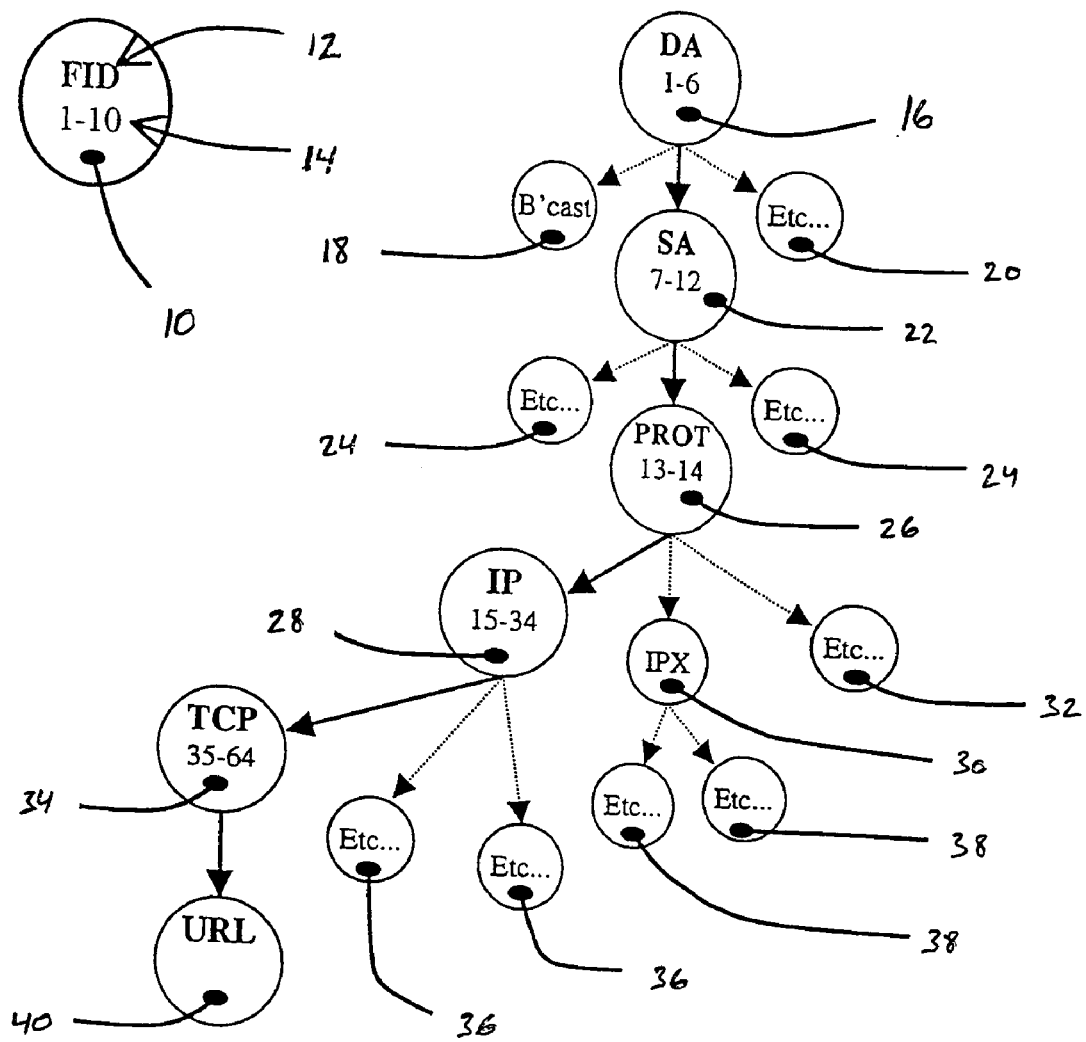
FIG. 2 shows that the decisions that need to be made in the parsing of the packet header can be represented as a tree.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

While there are essentially two different systems being taught in this specification, both of the systems are being used to solve network packet flow problems. Given the nature and complexity of computer networks, it should not be surprising that there are many different tasks being performed. Unfortunately, the complexity of computer networks and the many characteristics that affect network performance also prevents the solutions presented hereinafter from being obvious to those skilled in the art.

Beginning with the FIFO-based packet memory management system, priority queues are utilized for determining more flexible scheduling of network traffic. More specifically, while the prior art deals in managing buffers in busy networks to reduce error rates and dropped packets, the present invention makes it possible to deal with the issues of latency and bandwidth by using a FIFO of free packet buffer tags as a buffer management scheme. The NIC utilizes a packet buffer memory for temporary storage of incoming network data. Packet buffer allocation is handled with a first-in-first-out list of packet buffer address tags, wherein each tag identifies the beginning location in memory of a packet buffer. The packet buffer address tags are stored in any number of priority tag queues that are arbitrated in order to determine which packet buffer address tag will win the right to transmit the data that is stored in the corresponding packet buffer.

It is also noted that there are two levels of priority tag queues arbitration. The first level of arbitration is strictly on a priority basis. In other words, packet buffer address tags that are stored in higher priority tag queues have their packet buffer address tags selected ahead of packet buffer address tags that are stored in lower priority tag queues. In the presently preferred embodiment, four different priority tag queues are shown, meaning that there are four different levels of priority. However, any number of priority tag queues can be provided, only depending upon the number of levels that are required.

The second level of priority tag queues arbitration is that no priority tag queue will be denied service for more than a selectable number of consecutive transmit slots. In other words, even though a packet buffer address tag may be in a relatively low priority buffer queue, it will only be skipped over, because of a steady stream of packet buffer address tags in higher priority tag queues, only so many times. In this way, a certain amount of bandwidth can be guaranteed for even the lowest priority packet buffer address tag. Essentially, the host can manage these arbitration schemes, given the instructions regarding the second level of priority tag queue arbitration.

With this explanation in mind, it is now possible to look at the present invention in more detail.

Figure 4:
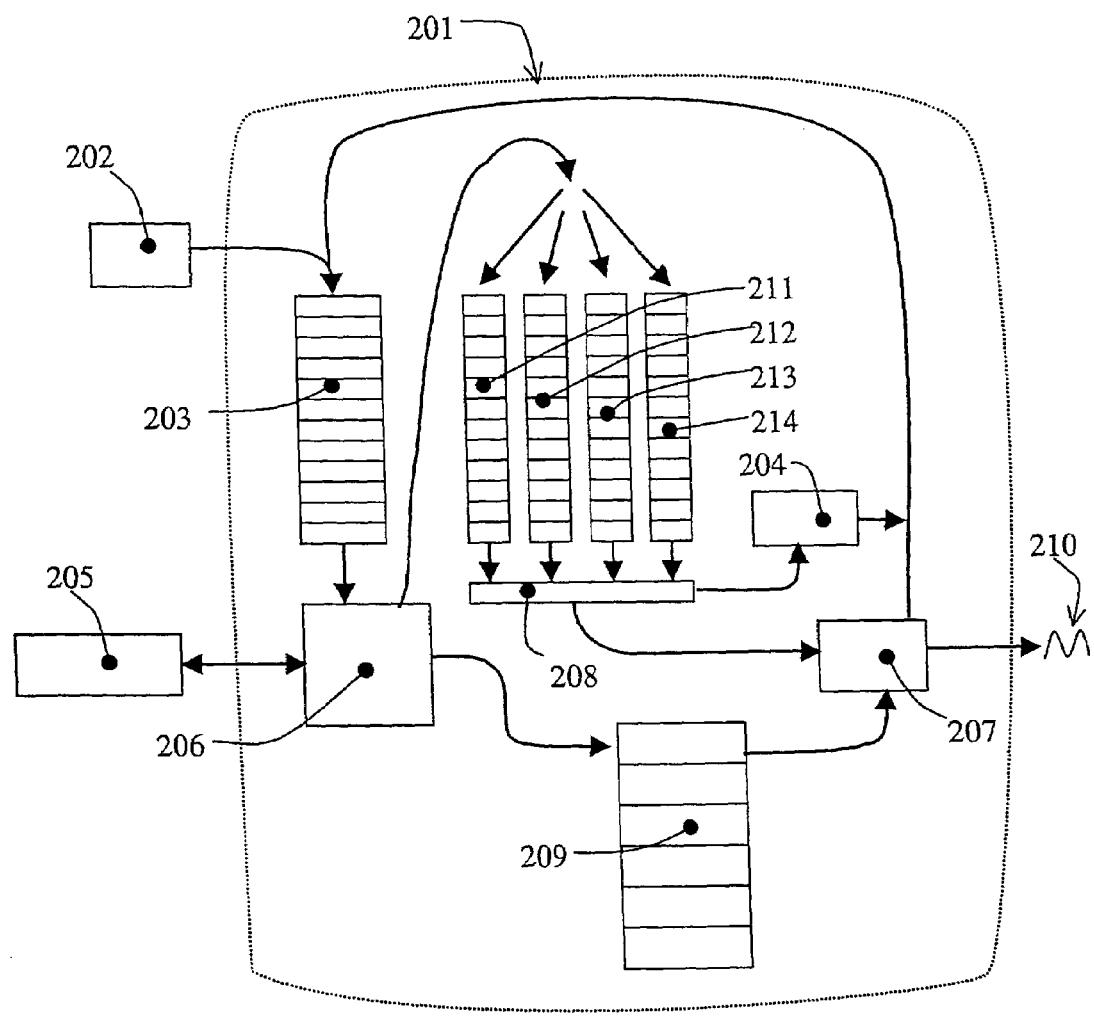
FIG. 4 is a block diagram of the transmit path followed by the presently preferred embodiment of the invention through a network interface card.

FIG. 4 is a block diagram of the transmit path followed by the presently preferred embodiment of the invention through a network interface card 201. The NIC 201 is comprised of the following functional blocks: a packet buffer free tag FIFO 203, a direct memory access engine 206, a packet buffer memory 209, a media access control intel face 207, a kill packet logic 204, a packet buffer tag priority scheduler 208, and four packet buffer tag priority FIFOs numbered 0 through 3 (211, 212, 213 and 214 respectively).

FIG. 4 provides the data paths associated with the transmission of network data from the host system memory 205 to the network physical interconnect 210. Initialization of the transmit data path begins with an initialization software routine 202 that fills all of the storage locations within the packet buffer free tag FIFO 203 with unique packet buffer free tag values.

Each tag value is an address that points to the beginning of a packet buffer contained within the packet buffer memory 209. The number of free tags in the packet buffer free tag FIFO 203 at initialization is dependant upon the total number of packet buffer contained in the packet buffer memory 209, which in turn determines the tag width in bits. For the purposes of this disclosure we assume that there are 256 packets buffers, which implies that there are an equal number of packet buffer tags and, therefore, that a packet buffer tag is eight bits wide.

We will further assume that the packet buffer memory 209 is organized as 32-bit words, and that each packet buffer contains 512 packet buffer memory locations. This means that each packet buffer is 2048 bytes in size and that the packet buffer memory 209 has a capacity of 512 KB.

Once the packet buffer free tag FIFO 203 has been initialized, software driver routines set up the direct memory access (DMA) engine 206 to begin the movement of transmit data from host system memory 205 to packet buffer memory 209. This setup may involve the development of a linked list of descriptor pointers for the DMA Engine to follow, or it may simply be informing the DMA Engine of the location of an application buffer in user space. Before the data transfer begins, the DMA Engine 206 pulls the first packet buffer tag out of the packet buffer free tag FIFO 203. Using this tag as a pointer to the beginning of a free packet buffer the DMA Engine starts to transfer data from Host System Memory 205 to packet buffer memory 209. Once the packet has been fully transferred, the DMA Engine can place the tag for that full packet buffer in one of the packet buffer tag priority FIFOs.

Which packet buffer tag priority FIFO receives the packet buffer tag is based on packet priority criteria contained within the packet. These packet priority criteria can be included as a part of the normal packet format (e.g. ethernet packet type field) or may be appended to the packet data by the host software and stripped off by the NIC prior to transmission on the network. For the purposes of this disclosure it is assumed that there are four packet buffer tag priority FIFOs, with packet buffer tag priority FIFO 211 containing tags for packets with the highest priority, while packet buffer tag priority FIFO 212, packet buffer tag priority FIFO 213 and packet buffer tag priority FIFO 214 are arranged in decreasing order of packet priority. It is understood, however, that any number of packet buffer tag priority FIFOs is possible in future embodiments of this invention.

Once a tag has been placed in any one or all of the packet buffer tag priority FIFOs the packet buffer tag priority scheduler 208 is called into action. The function of the packet buffer tag priority scheduler 208 is to arbitrate between each of the packet buffer tag priority FIFOs, determining which FIFO will supply the packet tag for the next packet buffer to be transmitted by the media access control (MAC) interface 207. The arbitration algorithm has two stages. First, there is the strict priority order, with packet buffer tag priority FIFO 211 having highest priority and packet buffer tag priority FIFO 214 having lowest priority. The second stage of priority filtering is the maximum latency stage. Each FIFO has a programmable value for the maximum packet latency, or the number of times it can be skipped before it will take precedence over higher priority FIFOs and be pushed ahead to be serviced. Each FIFO also has a counter that increments each time it is not empty and a packet tag from another FIFO is serviced. Table 2 is provided as a pseudo code description of how the maximum latency stage would operate.

If (skip_count_FIFO3>=max)latency_FIFO3)
   Then next_priority_out=FIFO3_next_tag;
Else If (skip_count_FIFO2>=max_latency_FIFO2)
   Then next_priority_out=FIFO2_next_tag;
Else If (skip_count_FIFO1>=max_latency_FIFO1)
   Then next_priority_out=FIFO1_next_tag;
Else If (packet_available_FIFO0=TRUE)
   Then next_priority_out=FIFO0_next_tag;
Else If (packet_available_FIFO1=TRUE)
   Then next_priority_out=FIFO1_next_tag;
Else If (packet_available_FIFO2=TRUE)
   Then next_priority_out=FIFO2_next_tag;
Else If (packet_available_FIFO3=TRUE)
   Then next_priority_out=FIFO3_next_tag;
Table 2

Another way of thinking about this is that the second level of arbitration is invoked only when a packet buffer tag priority FIFO request for service has been denied for a predetermined number of consecutive transmit slots. This insures that a lower priority packet buffer tag priority FIFO will be guaranteed a certain amount of transmit bandwidth even if the higher priority packet buffer tag priority FIFO has a sustained burst of network traffic.

Since the number of consecutive transmit slots that a Packet buffer tag priority FIFO can be passed over before service is guaranteed is a software configurable value it can be tuned by software for best-mode operation of the network. Basically, the maximum bandwidth a lower priority FIFO can steal from a higher priority FIFO is in the ratio of 1/(max. latency +1). This can be used in one of two ways: bandwidth limiting or bandwidth guarantees.

In the bandwidth limiting case the most critical data is entered into the highest priority FIFO and the other FIFO maximum latency registers can be set to relatively large values, for example FIFO maximum latency registers 1–3 could be set to 15. In this example only 3/16 of the packet bandwidth would be allowed to be stolen from the critical data path. One danger of this method is that if the sum of all the lower priority FIFO bandwidth maximums are greater than 100%, the highest priority FIFO can be completely starved.

In the bandwidth guarantees case the most critical data is entered into the lowest priority FIFO, FIFO 214 in this case, and the maximum latency registers of the remaining FIFOs set to 1. FIFO 214 will therefore be guaranteed 50% of the bandwidth and no other FIFO can steal its 50%. One drawback of this method is that no more than 50% of the packet bandwidth can be guaranteed.

Upon determining which packet buffer tag priority FIFO to select from, the oldest tag in that FIFO is passed to the MAC interface 207. The MAC interface 207 uses this tag to index into the packet buffer memory 209 and begins transmitting the data contained in the packet buffer pointed to by the packet buffer tag onto the network physical interconnect 210. After completing transmission of the packet, the tag is the placed back into the packet buffer free tag FIFO 203 for re-use.

In the event that the packet buffer memory 209 is completely consumed with network packet data and there are no tags left in the packet buffer free tag FIFO 203, the kill packet logic 204 can be programmed to pull tags from anyone of the packet buffer tag priority FIFOs and force their retirement to the packet buffer free tag FIFO 203 for re-use with incoming packets. This effectively causes the packet data previously loaded into the packet buffer associated with the "killed" tag to be dropped.

Figure 5:
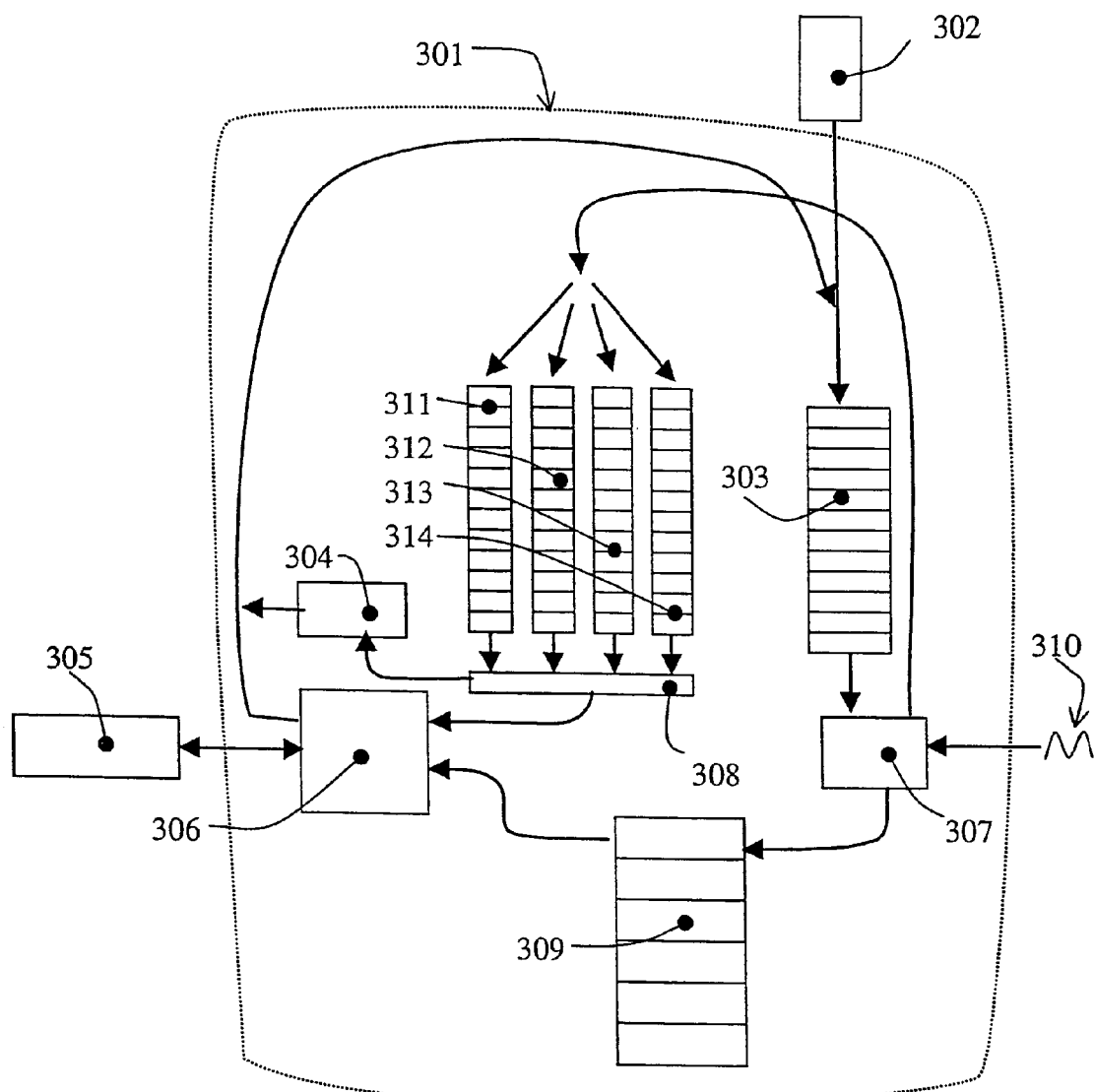
FIG. 5 contains a block diagram of the receiving path of the preferred embodiment of the present invention. It has the same number and types of functional blocks as the transmit path shown in FIG. 4 but packet data now is in the opposite direction.

FIG. 5 contains a block diagram of the receiving path of the preferred embodiment of the present invention. It has the same number and types of functional blocks as the transmit path shown in FIG. 4 but packet data now is in the opposite direction. In effect, the MAC interface 307 and the DMA engine 306 trade functional responsibilities regarding the management of packet buffers.

Having described the process of packet management above, it is now possible to address the issues of early packet steering.

In essence, the presently preferred embodiment utilizes multiple parallel decision logic within the Media Access Controller to parse the header of the incoming packet and obtain complete steering information at wire-speed in advance of the packet's complete arrival.

The concept behind an Early Packet Steering technique is that the important data at the front of the packet is received and processed before the remainder of the packet, or packet payload, even arrives. This concept enables efficient handling of the payload and wire-speed processing of worst-case packets. This eliminates or reduces the need to buffer entire packets in system memory or to reject packets due to a processing bottleneck.

These techniques, while somewhat specific to Ethernet, can be applied to any protocol or frame-type environment. Programmability is tied to the type of packet; the bytes of data become the actual operands in the process.

In sharp contrast to traditional processor-based parsing described above, the present invention collapses a plurality of the parsing decisions for a given packet into a single operation. For instance, rather than needing up to 10 separate compare/branch operations to parse the Destination Address, all 10 possibilities are examined in a single cycle and the appropriate outcome is derived.

In practice, the first 64 bytes of a TCP/IP packet contain all the information needed to make routing decisions about the packet, regardless of the size of the additional payload in the packet. Thus, if a packet is to be passed from input to output without any further processing, this can be determined in one parallel compare cycle, and the packet can be moved directly to the output process as it arrives, without having stored the packet in memory.

Figure 6:
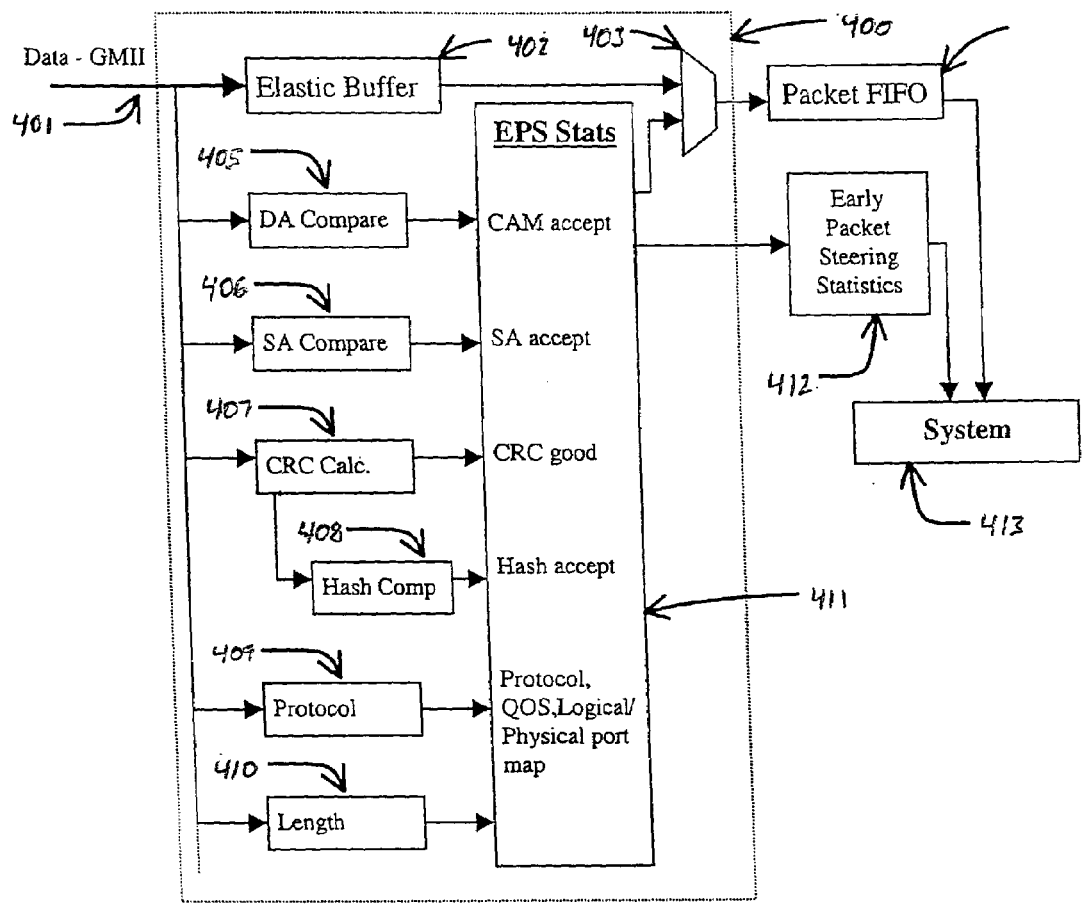
FIG. 6 is a block diagram illustration the logic of the Early Packet Steering implementation.

The Early Packet Steering implementation is shown logically in the block diagram of FIG. 6. The "SYSTEM" block 413 refers to the central processing unit (CPU) 60, system memory 58 and associated routing and output hardware 62 shown in FIG. 3.

The hardware implementation of the steering mechanism of the present invention utilizes a data-driven technique wherein decisions about routing the current packet are made as the initial 64 bytes of header information in the data stream 401 arrive in the front end elastic buffer 402 shown in FIG. 6. The Source Address 406, Destination Address 405, Protocol 409, and other fields may be examined as soon as they arrive. This block of data, called the Early Packet Processing Statistics 411, represents a "key" that indicates what kind of packet is arriving, where the packet needs to go, and what further processing may be required. This data becomes an index for the decision-making logic that performs the packet steering function, which may include logical to logical or logical to physical mapping.

The logical Destination Address 405 is treated as an index that points to a physical port. Rather than maintaining a map of all possible port addresses, as one might do in software, the hardware can map directly to the existing physical ports on the device using Content Addressable Memory (CAM) techniques. Rather than millions or perhaps billions of possible outcomes, then, the comparison is only valid for a small, manageable number of outcomes. The EPS data 408 informs the System 413 about the validity of the DA. Similarly, the SA comparison block 406 can flag particular source addresses whose data or packets require special routing, actions or rejection.

Calculating the CRC 407 in hardware as the packet arrives saves the System 413 from having to perform that calculation, saving some additional overhead. Furthermore, the CRC calculation 407, while not complete until the entire packet is received, can provide useful information as soon as the first 48 bytes (the DA), are received. Using the incomplete CRC 407 as an index into a hash table 408, the EPS data 408 can indicate via the EPS Statistics 412 whether or not to accept the packet very early in the process.

Quality of Service (QOS) and other pertinent information 409, 410 can also be derived in parallel fashion once the needed bytes have arrived. The same steering mechanism can map to processes that, for example, increment the TCP/IP Time To Live, or other functions that modify the packet, all in one step. Additional comparison blocks can be designed in as needed, and their results added to the EPS data. The information derived from parsing the packet is passed with the packet as a status word, also shown in FIG. 6. This data is appended to the packet 403 as it passes to the Packet FIFO 404. It is primarily utilized within the switch, though it could appear outside the switch in Virtual LAN (VLAN) or interswitch applications where multiple switches are configured to function as a single switch entity. This status word is made available to the System 413 as soon as the necessary processing is completed, which may be as early as byte 16 if all the steering data necessary is in the Ethernet header. Once the steering logic has completed its work, the System 413 can be notified that the status word is available.

Figure 3:
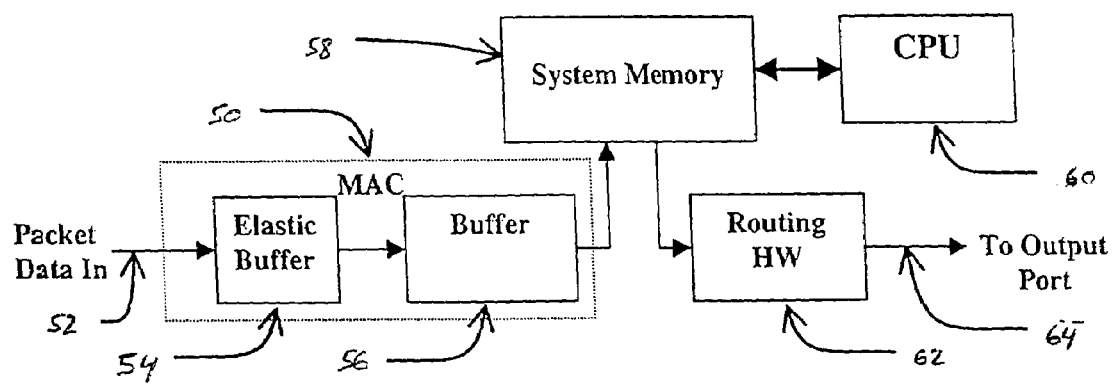
FIG. 3 is provided as a block diagram to show the manner in which packet processing is normally implemented in hardware.

Referring to FIG. 3, the system memory 58 serves as temporary storage for packets that require further processing, such as those for which valid comparisons have not been found, or those that require modification or additional processing. To facilitate these manipulations, the CPU 60 within the System 413 can consult the packet steering status (PSS) word appended to the packet in the FIFO 404 as well as the EPSS 412 to obtain information about the status and content of the packet in advance of its arrival in system memory 58. Appropriate actions can be taken, or processes such as output routing can be initialized to more efficiently manage the packet.

The Packet Steering Status word is inserted in the packet 403 on its way to the Packet FIFO 404. It has the format shown in Table 3. The FIFO entry includes Destination Address, Source Address, and an alignment byte followed by the Protocol field. Bytes following the Protocol field may be used like the alignment byte to provide offsets needed for the system. The EOP is an End Of Packet field, which may or may not be followed by an alignment byte to ensure the PSS word is on a proper boundary. The next packet immediately follows the PSS word.

TABLE 3

| Typical Packet FIFO Entry |
| --- |
| DA |
| SA         DA |
| SA |
| (alignment byte)         PROTOCOL |
| X         X         EOP         X |
| PACKET STEERING STAUS (PSS) |
| Next Packet(s) |

The EPSS are stored in another register 412 available to the system 413. This information reflects the status of parsing the current packet and can provide steering information that may not yet be available in the PFIFO. The EPSS data is current only when there is a single packet in the PFIFO. If there are more, the System 413 utilizes the PSS word when it acquires a packet from the PFIFO 404 for further processing.

Alternatively, the inventors have described another implementation wherein the Early Packet Steering Statistics for multiple packets in the PFIFO 404 are collected and managed to facilitate downline processing.

It is noted that some specialized ASIC processors that are optimized to identify particular protocol information are available. These are normally utilized within the packet processing system, after the packet has left the MAC. Such processors all require at least 64 bytes of data in order to start processing. In contrast, the present invention needs as few as 16 bytes of data. Thus, the packet has not even reached the normal processing system.

It is noted that one particular advantage of the current invention is the low latency afforded by Early Packet Steering technology. In a worst-case scenario, traditional methods may require many thousands or even millions of clock cycles to parse a worst-case packet. Higher 1 atencies mandate additional memory and support circuitry, increasing costs. As explained above, this is not the case in the present invention in the worst-case scenarios.

Another advantage of the current invention is the reduction of the amount of support circuitry needed for the elastic buffer, since the time from input to output is reduced. The reduction in time means that the elastic buffer need not handle large packets.

Another advantage of the present invention is the offloading of processing tasks from the system CPU and bus. Because the CPU no longer needs to parse certain information within the packet, performance is enhanced, and the feasibility of utilizing a simpler, less expensive CPU increases.

It is also observed that there are broader applications of the method and implementation than those described. These techniques can apply in any setting where a packet-like data stream needs to be parsed at high speed.

Accordingly, the present invention makes it possible to derive packet steering information within a Media Access Controller, which is much earlier than in traditional packet parsing designs.

Furthermore, parallel processing of packet data is used to derive a plurality of steering and processing criteria. And the production of Early Packet Steering Statistics enable faster and more efficient processing of packet data within the traditional processing framework.

It is to be understood that the above-described arrangements are only illustrations of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for early packet steering by examining a packet as it is received at a routing location, thereby avoiding having to store the entire packet in memory prior to processing, said method comprising the steps of:
   (1) parsing the packet as it is received to thereby extract portions of a packet header;
   (2) processing the packet header in parallel before the arrival of a packet payload being carried by the packet; and
   (3) steering the packet to a correct address without storing the entire packet payload in memory.

2. The method as defined in claim 1 wherein the method further comprises the step of collapsing a plurality of parsing decisions for the packet into a single operation.

3. The method as defined in claim 2 wherein the method further comprises the step of simultaneously performing a plurality of compare and branch operations in a single clock cycle to thereby parse a destination address of the packet.

4. The method as defined in claim 3 wherein the method further comprises the step of passing the packet to an output port immediately upon arrival of the packet payload.

5. The method as defined in claim 4 wherein the method further comprises the step of parsing the packet after arrival of the initial 64 bits of the packet header of the packet.

6. The method as defined in claim 5 wherein the method further comprises the step of determining before the first 64 bits have arrived if there is a problem with the packet which will preclude further processing of the packet.

7. The method as defined in claim 6 wherein the method further comprises the steps of:
   (1) receiving the packet into an elastic buffer to thereby enable the system to perform its analysis before the entire packet arrives; and
   (2) parsing information from the packet header in parallel, including destination address, source address, information to perform a cyclical redundancy check (CRC) and a hash table comparison, protocol analysis, and length analysis.

8. The method as defined in claim 7 wherein the method further comprises the step of compiling early packet steering statistics that are utilized to determine if the packet is valid, and a destination address for routing the packet.

9. The method as defined in claim 8 wherein the method further comprises the steps of:
   (1) treating the destination address as an index that points to a physical port; and
   (2) mapping directly to the physical port address utilizing content addressable memory techniques such that rather than billions of possible outcomes, a comparison is valid for a relatively small and manageable number of physical ports.

10. The method as defined in claim 9 wherein the method further comprises the step of utilizing the source address analysis to determine if an incoming packet has special requirements including special routing, special actions or rejection.

11. The method as defined in claim 10 wherein the method further comprises the step of performing the CRC calculation in hardware as the packet arrives, thereby removing that step from a host CPU and saving overhead, wherein the CRC can be performed as soon as the destination address has arrived in the packet.

12. The method as defined in claim 11 wherein the method further comprises the steps of:
   (1) generating a status word, wherein the status word is utilized to transfer the packet to a correct destination address; and
   (2) appending the status word to the packet so that it can be retrieved from as the packet as is necessary.

13. The method as defined in claim 12 wherein the method further comprises the steps of:
   (1) storing a destination address in the status word;
   (2) storing a source address in the status word;
   (3) storing an alignment byte in the status word;
   (4) storing a protocol field in the status word; and
   (5) storing an end of packet field in the status word.

14. The method as defined in claim 13 wherein the method further comprises the step of reducing latency of the packet as it is received, thereby reducing a cost of the system because less memory is required for storing incoming packets, and less support circuitry is required to support the memory.

15. The method as defined in claim 14 wherein the method further comprises the steps of:
   (1) reducing a total time between input and output of the packet; and
   (2) reducing overhead on a system bus by parsing the packet header without having to send the packet header to the host CPU.

* * * * *